(12) United States Patent
Fang et al.

(10) Patent No.: US 11,782,579 B2
(45) Date of Patent: Oct. 10, 2023

(54) DESKTOP DISPLAY CONTROL BY INTELLIGENTLY NESTING ONE OBJECT IN ANOTHER OBJECT

(71) Applicant: BEIJING BYTEDANCE NETWORK TECHNOLOGY CO., LTD., Beijing (CN)

(72) Inventors: Chi Fang, Beijing (CN); Haizhou Zhu, Beijing (CN); Kezhen Li, Beijing (CN); Qiwei Cai, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/733,991

(22) Filed: Apr. 29, 2022

(65) Prior Publication Data

US 2022/0261122 A1    Aug. 18, 2022

Related U.S. Application Data

(63) Continuation of application No. PCT/CN2020/120389, filed on Oct. 12, 2020.

(30) Foreign Application Priority Data

Oct. 31, 2019   (CN) .......................... 201911052155.9

(51) Int. Cl.
*G06F 3/0482*   (2013.01)
*G06F 9/451*    (2018.01)
(Continued)

(52) U.S. Cl.
CPC ........ *G06F 3/0482* (2013.01); *G06F 3/04847* (2013.01); *G06F 9/451* (2018.02); *G06F 9/485* (2013.01)

(58) Field of Classification Search
CPC .... G06F 3/0482; G06F 3/04847; G06F 9/451; G06F 9/485
See application file for complete search history.

(56) References Cited

U.S. PATENT DOCUMENTS 5,859,639 A *  1/1999  Ebrahim ............... G06F 3/0481
                                                        715/977
9,223,426 B2 * 12/2015  Sirpal ................... G06F 3/0488
(Continued)

FOREIGN PATENT DOCUMENTS

CN          1786906 A        6/2006
CN        102193719 A        9/2011
(Continued)

OTHER PUBLICATIONS

WIPO Machine Translation of CN 102193719 (Year: 2011).*
International Patent Application No. PCT/CN2020/120389; Int'l Search Report; dated Jan. 13, 2021; 2 pages.

*Primary Examiner* — Eric J. Bycer
(74) *Attorney, Agent, or Firm* — BakerHostetler (57) ABSTRACT

A desktop display control method and apparatus, a terminal, and a storage medium. The method comprises: determining whether a view (3) of a first task is currently displayed on a desktop (1) (S101); if it is determined that the view (3) of the first task is currently displayed on the desktop (1), displaying a view of a third control in a view (2) of a second control (S102); and if it is determined that the view (3) of the first task is not currently displayed on the desktop, not displaying the view of the third control in the view of the second control (S103). The first task comprises a first application and/or a first control, wherein the first application is not an application of the desktop, and the second control and the third control are both controls displayed on the desktop. The method dynamically displays the view of the third control in the view of the second control according to the specific (Continued)

display state of the task view on the desktop, and thus a user can interact with the view of the third control conveniently, the interaction steps are simplified, and the user experience is improved.

19 Claims, 6 Drawing Sheets

(51) Int. Cl.
*G06F 3/04847* (2022.01)
*G06F 9/48* (2006.01)

(56) References Cited

U.S. PATENT DOCUMENTS

| | | | | |
|---|---|---|---|---|
| 2002/0196286 A1* | 12/2002 | Taylor | ................... | G09G 5/14 715/788 |
| 2005/0060665 A1* | 3/2005 | Rekimoto | ............... | G06F 9/451 715/810 |
| 2005/0125736 A1 | 6/2005 | Ferri et al. | | |
| 2006/0123353 A1* | 6/2006 | Matthews | ............. | G06F 3/0481 715/779 |
| 2006/0248471 A1* | 11/2006 | Lindsay | .................. | G09G 5/14 715/800 |
| 2007/0113196 A1* | 5/2007 | Wang | .................... | G06F 3/0483 715/791 |
| 2007/0192726 A1 | 8/2007 | Kim et al. | | |
| 2014/0040819 A1* | 2/2014 | Duffy | .................... | G06F 3/0481 715/789 |
| 2019/0179662 A1* | 6/2019 | Chen | ....................... | G06F 9/485 |
| 2020/0341615 A1* | 10/2020 | Jin | ........................ | G06F 9/4401 |

FOREIGN PATENT DOCUMENTS

| | | |
|---|---|---|
| CN | 102830966 A | 12/2012 |
| CN | 102929537 A | 2/2013 |
| CN | 103793137 A | 5/2014 |
| CN | 103955326 A | 7/2014 |
| CN | 110147191 A | 8/2019 |
| CN | 110795194 A | 2/2020 |

* cited by examiner

DESKTOP DISPLAY CONTROL BY INTELLIGENTLY NESTING ONE OBJECT IN ANOTHER OBJECT

CROSS-REFERENCES TO RELATED APPLICATIONS

The disclosure is a continuation of PCT application No. PCT/CN2020/120389, titled "Desktop Display Control Method and Apparatus, Terminal and Storage Medium", filed on Oct. 12, 2020, which claims priority to Chinese patent application No. 201911052155.9, filed on Oct. 31, 2019, titled "Desktop Display Control Method and Apparatus, Terminal and Storage Medium", the entire contents of both of which are incorporated herein by reference.

TECHNICAL FIELD

The disclosure relates to the field of computer technology, in particular to a desktop display control method and apparatus, a terminal and a storage medium.

BACKGROUND

When a user clicks on a desktop icon to open a task window, a task window usually covers other desktop icons, and then if the user wants to click on another desktop icon, he has to minimize the current task window or return to the desktop before clicking the desktop icon. This operation process is cumbersome and also affects the user's interactive experience with the currently opened task window.

SUMMARY

The summary is provided to introduce concepts in a brief form, and these concepts will be described in detail in the following specific embodiments. The summary is not intended to identify the key features or essential features of the technical solution that is required to be protected, nor is it intended to limit the scope of the claimed technical solution.

One aspect of the disclosure provides a desktop display control method, comprising:
    determining whether a view of a first task is currently displayed on a desktop;
    if it is determined that the view of the first task is currently displayed on the desktop, displaying a view of a third control in a view of a second control; and
    if it is determined that the view of the first task is not currently displayed on the desktop, not displaying the view of the third control in the view of the second control;
    wherein the first task comprises a first application and/or a first control, wherein the first application is not an application of the desktop, and wherein the second control and the third control are both controls displayed on the desktop.

Another aspect of the disclosure provides a desktop display control apparatus, comprising:
    at least one processor; and
    at least one memory communicatively coupled to the at least one processor and storing instructions that upon execution by the at least one processor cause the apparatus to perform operations comprising:
    determining whether a desktop currently displays a view of a first task; and
    displaying a view of a third control in a view of a second control if it is determined that the view of the first task is currently displayed on the desktop; and
    not displaying the view of the third control in the view of the second control if it is determined that the view of the first task is not currently displayed on the desktop;
    wherein the first task comprises a first application and/or a first control, wherein the first application is not an application of the desktop, and wherein the second control and the third control are both controls displayed on the desktop.

Yet another aspect of the disclosure provides a non-transitory computer storage medium, storing computer-readable instructions to perform operations when the computer-readable instructions are executed by a computing device, the operations comprising:
    determining whether a view of a first task is currently displayed on a desktop;
    if it is determined that the view of the first task is currently displayed on the desktop, displaying a view of a third control in a view of a second control; and
    if it is determined that the view of the first task is not currently displayed on the desktop, not displaying the view of the third control in the view of the second control;
    wherein the first task comprises a first application and/or a first control, wherein the first application is not an application of the desktop, and wherein the second control and the third control are both controls displayed on the desktop.

In some embodiments of the disclosure, a view of a third control is displayed in a view of a second control according to the display state of a task view on a desktop, and thus a user can interact with the view of the third control conveniently, the interaction steps are simplified, and the user experience is improved.

BRIEF DESCRIPTION OF THE DRAWINGS

The above and other features, advantages and aspects of the embodiments of the disclosure will become clearer in conjunction with the accompanying drawings and with reference to the following specified embodiments. The same or similar drawing symbols indicate the same or similar elements in the accompanying drawings. It should be understood that the drawings are schematic and the originals and elements are not necessarily drawn to scale.

DETAILED DESCRIPTION OF THE DISCLOSURE

Embodiments of the disclosure will be described in more detail with reference to the accompanying drawings below.

Although some embodiments of the disclosure are shown in the accompanying drawings, it should be understood that the disclosure can be implemented in various forms and should not be construed as being limited to the embodiments set forth herein. On the contrary, these embodiments are provided for a more thorough and complete understanding of the disclosure. It should be understood that the accompanying drawings and embodiments of the disclosure are only used for exemplary purposes, and are not used for limiting the protection scope of the disclosure.

It should be understood that the steps illustrated in the method embodiments of the disclosure may be performed in a different order, and/or performed in parallel. In addition, the method embodiments may include additional steps and/or omit the execution of the steps shown. The scope of the disclosure is not limited in this respect.

The term "comprising" and its variants as used herein means open-ended including, that is, "including but not limited to". The term "according to" means "according, at least in part, to". The term "one embodiment" means "at least one embodiment"; the term "another embodiment" means "at least one additional embodiment"; and the term "some embodiments" means "at least some embodiments." Related definitions of other terms will be given in the following description.

It should be noted that the terms such as "first" and "second" mentioned in the disclosure are only used for distinguishing different objects, apparatus, modules or units, and are not used for limiting the order or interdependence of the functions performed by these objects, apparatus, modules or units.

It should be noted that the modifications of "a" and "multiple" mentioned in the disclosure are illustrative and not restrictive, and those skilled in the art should understand that unless the context clearly indicates otherwise, they should be understood as "one or more".

The names of messages or information exchanged between multiple apparatus in the embodiments of the disclosure are only used for illustrative purposes, and are not used for limiting the scope of these messages or information.

Figure 1:
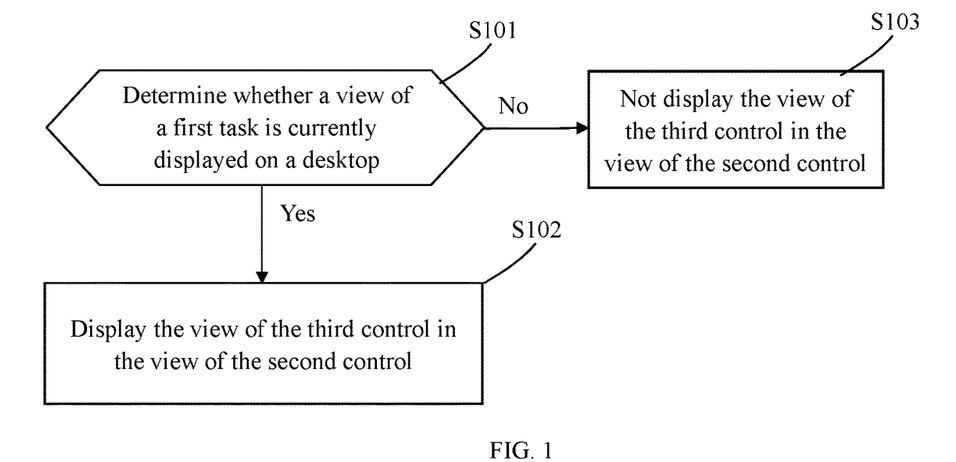
FIG. 1 is a flowchart of a desktop display control method provided by an embodiment of the disclosure.

FIG. 1 shows an example process in accordance with the present disclosure. The example process 100 as shown in FIG. 1 comprises step S101 to step S103:

Step S101: whether a view of a first task is currently displayed on a desktop of terminal is determined. In some embodiments, step S101 may further include the following operations: a current active control of the terminal is acquired; and whether the view of the first control is currently displayed on the desktop is determined according to the current active control. The current active control may be the control that gets the focus on the desktop.

If it is determined that the view of the first task is currently displayed on the desktop, step S102 is performed as follow: a view of a third control is displayed in a view of a second control.

If it is determined that the view of the first task is not currently displayed on the desktop, step S103 is performed as follow: a view of a third control is not displayed in a view of a second control.

The first task includes a first application and/or a first control, and the first application is not desktop itself, and the second control and the third control are both view controls displayed on the desktop. In some embodiments, the first application may include an application with a large application window that covers part or all of the view of the third control after opening, and some applications that do not display windows or have small windows may not be set as the first application. In some embodiments, the first control may include a control with a large view, such as an application drawer or an application manager, and the second control and the third control are both controls displayed on the desktop. In an embodiment of the disclosure, the view of the second control, such as the desktop task bar, navigation bar, status bar or other application/control displayed in other positions on the desktop, is arranged to display the view of the third control originally displayed on the desktop. In some embodiments, the second control is a task bar or a navigation bar, and the third control is an icon. In an embodiment of the disclosure, when a terminal responds to a user's instruction to open a view of the first task on the desktop, a view of the third control which would have been covered with a view of a first task is displayed in a view of the second control; and if the desktop does not display any view of the first task, for example, the task view is minimized by the user or the user exits the application, the view of the second control stops display the view of the third control.

Therefore, the method provided by various embodiments of the disclosure dynamically displays the view of the third control in the view of the second control according to the specific display state of the task view on the desktop, and thus a user can interact with the view of the third control conveniently, the interaction steps are simplified, and the user experience is improved.

In some embodiments, the example process 100 further includes: if it is determined that the view of the first task is not currently displayed on the desktop, the view of the third control is displayed on the desktop.

Therefore, if it is determined that the view of the first task is currently displayed on the desktop, the view of the third control is displayed in the view of the second control, and is not displayed on the desktop accordingly, for example, the view of the third control on the desktop is displayed in an invisible state, which creates an animation effect of the view of the third control "moving" from the desktop to the view of the second control and improves the utilization rate of the display space.

In an embodiment, the layer of the view of the third control is above the layer of the view of the first task and the layer of the view of the second control. Thus, in the process that the desktop stops displaying the view of the third control or the view of the second control and starts to display the view of the third control, the view of the third control is always visible to the user so that the user can observe the animation effect of the view of the third control "moving" from the desktop to the view of the second control.

In an embodiment, the example process 100 may further include: after the view of the third control is displayed in the view of the second control, the view of the third control is not displayed on the desktop. In this way, the view of the third control is displayed in the view of the second control at first and then stopped displaying on the desktop, which can remind the user that the view of the third control originally displayed on the desktop is currently displayed in the view of the second control.

In an embodiment, the example process 100 may further includes: after the view of the third control is displayed on the desktop, the view of the third control is not displayed in the view of the second control, thereby implementing that the view of the third control is displayed on the desktop at first and then stopped displaying in the view of the second control. This can remind the user that the view of the third control originally displayed in the view of the second control is currently displayed on the desktop.

In some embodiments, displaying the view of the third control in the view of the second control further comprises: calculating a size and a position in which the view of the third control will be present in the view of the second control based on existing views currently displayed in the view of the second control; and displaying the view of the third control in the view of the second control according to the calculated size and the calculated position.

In an embodiment of the disclosure, if one or more views is currently displayed in the view of the second control, for example, an icon is currently fixed on the desktop task bar, then the position and size in which the view of the third control will be present are allocated, according to the number or size of the views currently displayed in the view of the second control, to prevent the views from overlapping with each other and help to achieve the animation effects of view "translation" and "receding".

In some embodiments, not displaying the view of the third control in the view of the second control further includes: calculating a size and a position in which the view of the third control will be present in the view of the second control based on existing views currently displayed in the view of the second control; and not displaying the view of the third control in the view of the second control according to the calculated size and the calculated position.

After the view of the second control displays the view of the third control, the user may operate or adjust the views in the view of the second control, for example, the user may remove one or more views from the view of the second control, therefore the views displayed in the view of the second control may change at any time. Therefore, in the embodiments of the disclosure, the size and position in which the view of the third control are present in the view of the second control are re-acquired according to all the views currently displayed in the view of the second control before the view of the third control is removed from the view of the second control.

In some embodiments, the example process 100 may further include: sending, from a view of the desktop, a request for acquiring a size and a position of the view of the third control to be displayed in the view of the second control to the second control; calculating the size and the position in which the view of the third control will be displayed in the view of the second control based on existing views currently displayed in the view of the second control; and sending the calculated size and the calculated position to the view of the desktop.

In further embodiments, the example process 100 may further include: sending, from the view of the desktop, a notification of adding the view of the third control to the second control; loading the view of the third control according to the calculated size and the calculated position by the view of the second control and setting the display state of the view of the third control to be invisible on the desktop; sending a notification of setting the display state of the view of the third control to be visible to the second control by the view of the desktop; and setting the display state of the view of the third control to be visible by the second control.

In other embodiments, the example process 100 may further include the: sending a notification of setting the view of the third control to be invisible to the second control by a view of the desktop; setting the display state of the view of the third control to be invisible according to the calculated size and the calculated position by the view of the second control; sending a notification of removing the view of the third control to the view of the second control by the view of the desktop; and removing the view of the third control by the second control.

In the above embodiment, if the view of the third control is displayed on the view of the desktop, the view of the desktop is the parent view of the third control; and if the view of the third control is displayed in the view of the second control, the second control is the parent view of the third control. The parent view is a container view used for holding child views. Through the above-mentioned interaction process between the view of the desktop and the second control, the third control can be switched and displayed more smoothly between the view of the desktop and the second control.

In some embodiments, a view list is created for recording the identifier of the third control and the size and position of the view of the third control in the view of the second control; and the view of the third control is displayed according to the created view list. And Step S103 further includes the following step: the identifier, size and position of the third control recorded in the view list are removed. In this embodiment, the view list is created to record the identifier of the third control and the size and position of view the third control displayed in the view of the second control so that the view of the third control can be conveniently displayed in or removed from the second control. In some embodiments, the identifier of the third control includes the application package name, control name or component name corresponding to the third control, and the size and/or position of the view of the third control may be represented by boundary coordinates.

In some embodiments, the view of the second control is a navigation bar, and the third control is an icon. The navigation bar is a window used for displaying task views, such as the navigation bar under the ANDROID® system, the task bar under the WINDOWS system, or the Dock bar under the MACOS® system.

To facilitate understanding, FIGS. 2-6 show schematic diagrams of views of a second control provided by some embodiments of the disclosure.

Figure 2:
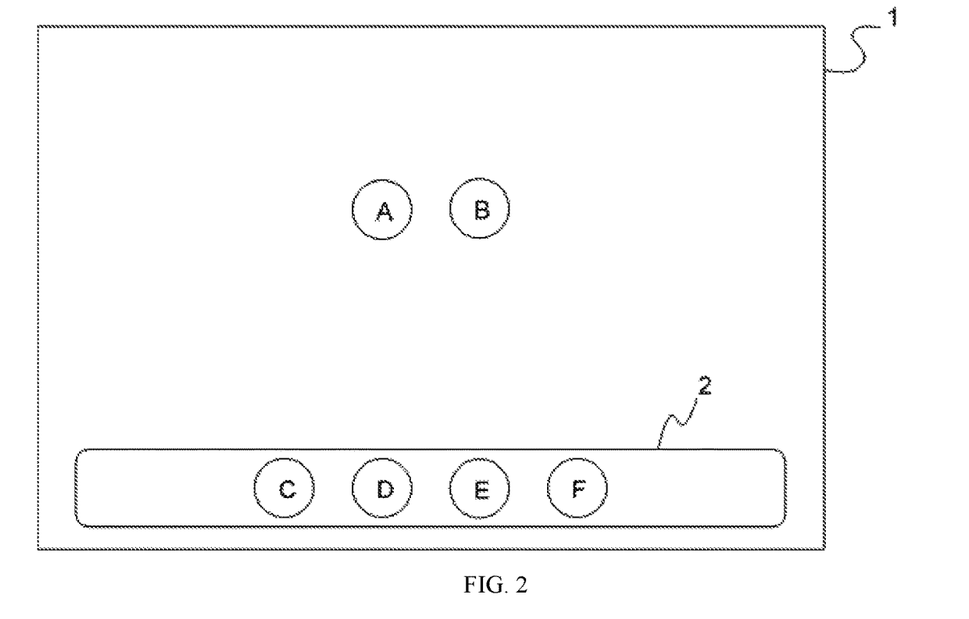
FIG. 2 is a schematic diagram of a view of a second control provided by an embodiment of the disclosure.
Figure 3:
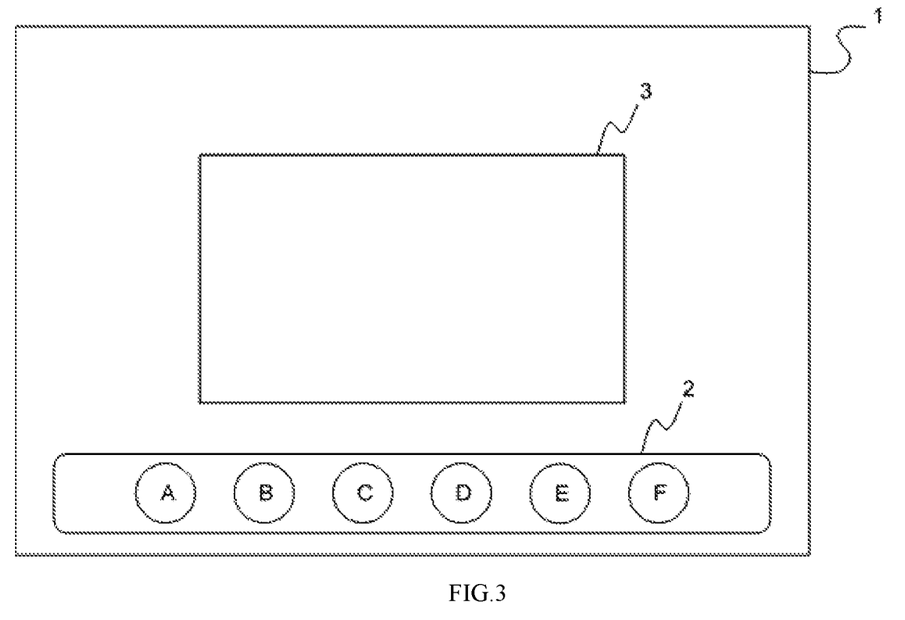
FIG. 3 is a schematic diagram of a view of a second control provided by an embodiment of the disclosure.

FIGS. 2 and 3 show schematic diagrams of views of a second control provided by an embodiment of the disclosure. Referring to FIG. 2, third control views A and B and second control view 2 are displayed on a desktop 1 of a terminal. In this embodiment, the second control view 2 is a navigation bar currently displaying child views, namely icons C, D, E and F. Referring to FIG. 3, if a first task view 3 is currently displayed on the desktop 1, the third control views A and B is displayed in the second control view 2 accordingly.

Figure 4:
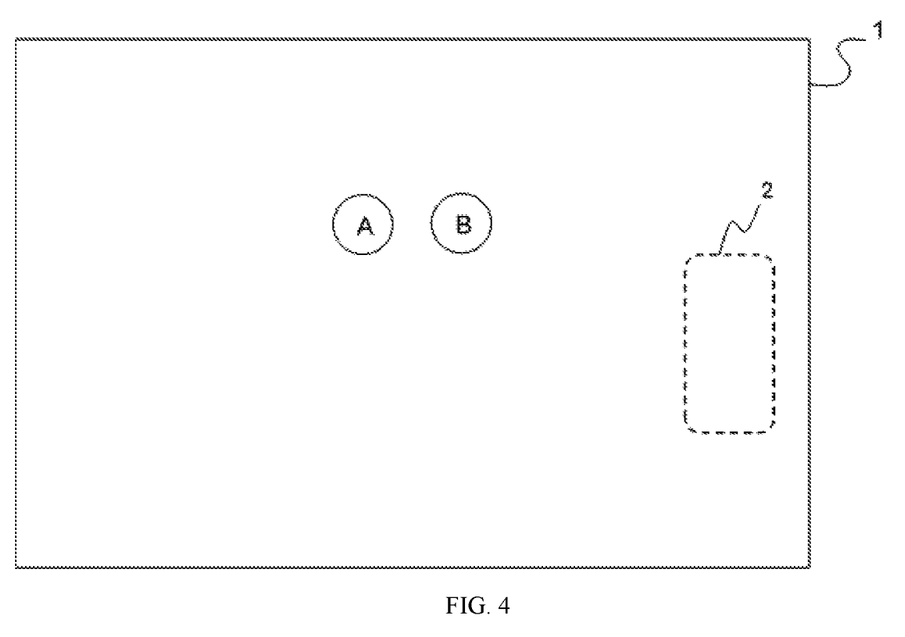
FIG. 4 is a schematic diagram of a view of a second control provided by another embodiment of the disclosure.
Figure 5:
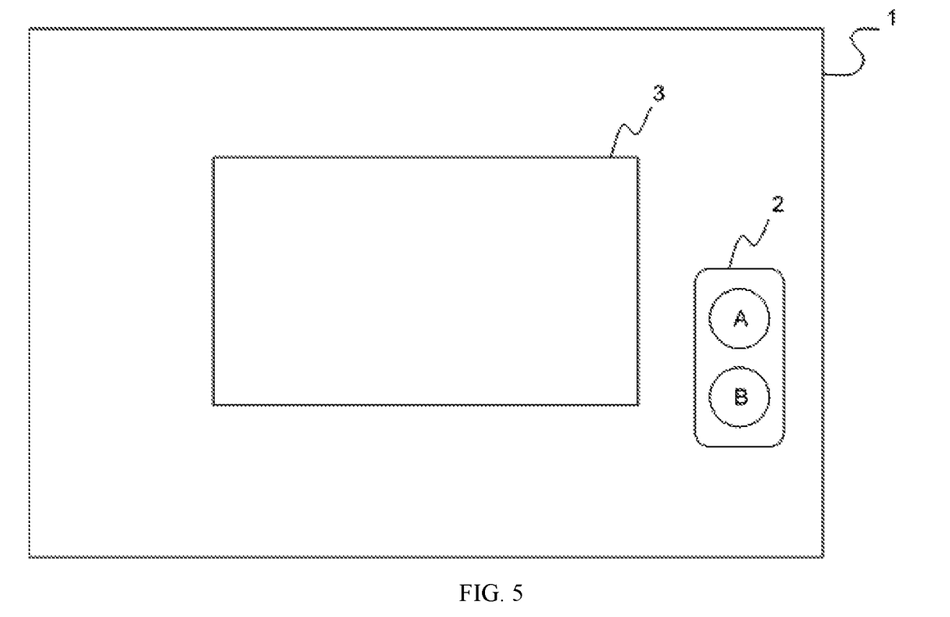
FIG. 5 is a schematic diagram of a view of a second control provided by another embodiment of the disclosure.

FIGS. 4 and 5 show schematic diagrams of views of a second control provided by another embodiment of the disclosure. In this embodiment, views of the second controls are located in other desktop areas outside the navigation bar. Referring to FIG. 4, third control views A and B are displayed on the desktop 1 of the terminal, and second control view 2 displayed on the lower right corner of the desktop 1 is in an invisible state. For ease of understanding, the second control view 2 is represented by a dotted line. Referring to FIG. 5, if a first task view 3 is currently displayed on the desktop 1, the second control view 2 becomes visible where the third control views A and B are displayed.

Figure 6:
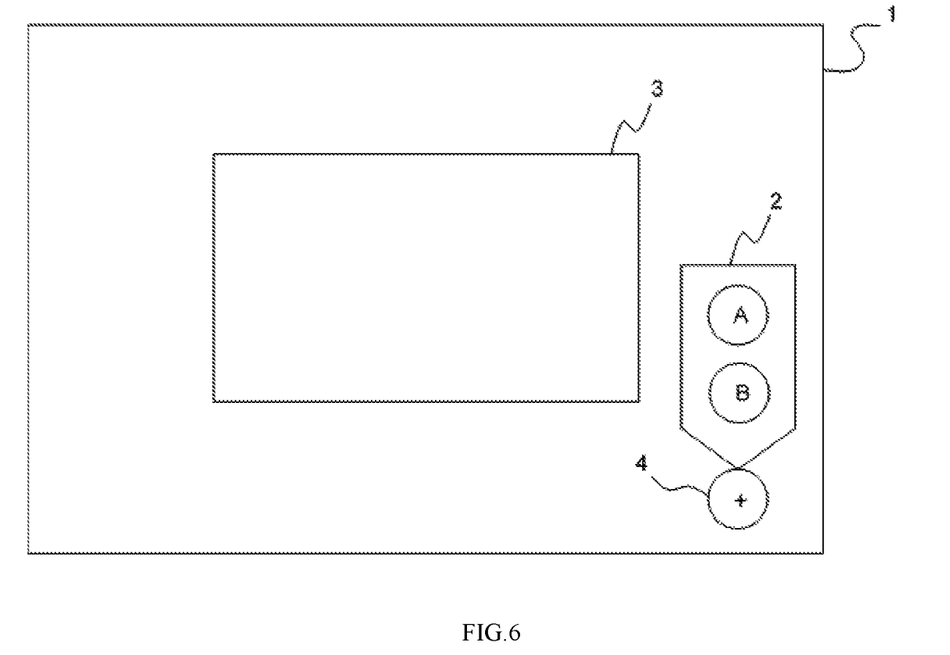
FIG. 6 is a schematic diagram of a view of a second control provided by another embodiment of the disclosure.

FIG. 6 shows a schematic diagram of a view of a second control provided by another embodiment of the disclosure. Referring to FIG. 6, in some embodiments, if it is determined that the first task view 3 is currently displayed on the desktop, an icon 4 corresponding to the view of the second control is displayed on the desktop 1, and the terminal responds to the icon 4 being triggered to display the second control view 2 in which the third control views A and B are displayed.

In some embodiments, if the first task includes a first application, determining whether a view of a first task is currently displayed on a desktop may further include: acquiring foreground applications of the terminal.

Taking the ANDROID® system as an example, the package name of the foreground application of the terminal may be acquired through methods of Running Task, Running Process or ActivityLifecycleCallback, and the foreground application of the terminal may also be acquired by detecting an application-switching event. In some embodiments, if an event that an application is moved to the foreground is detected, the foreground application of the terminal is acquired. In some embodiments, the foreground application may be actively acquired at a predetermined time interval, or the foreground application may be passively acquired after the application switching event is detected, or through other operations, which is not limited in this embodiment. The determining whether a view of a first task is currently displayed on a desktop may further include determining whether the view of the first application is currently displayed on the desktop according to the foreground applications.

Wherein the foreground application refers to an application whose process is in the foreground and displayed on a screen of the terminal. In the embodiment of the disclosure, for example, if the first application is a foreground application, it can be determined that the view of the first application is currently displayed on the desktop.

Figure 7:
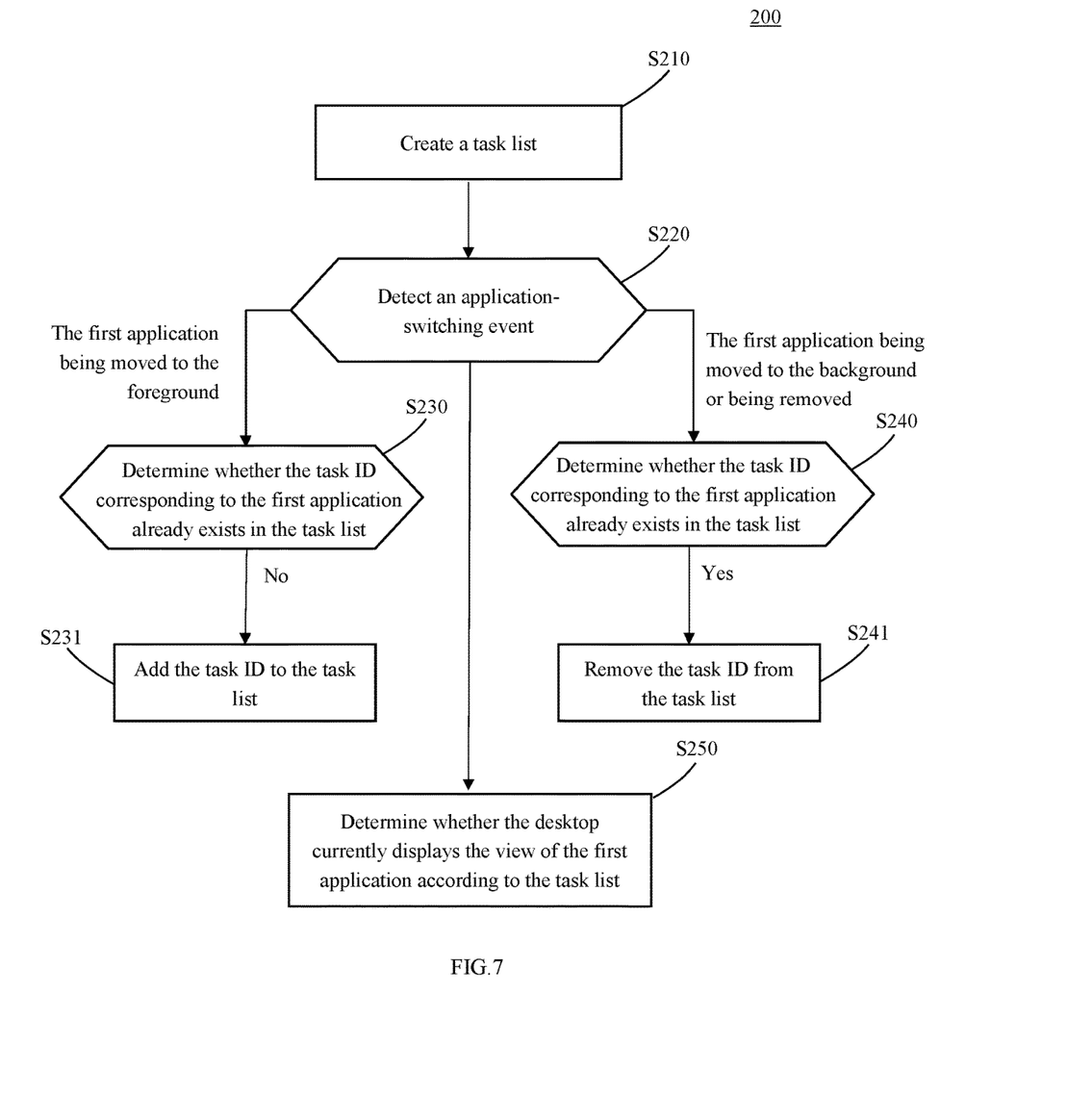
FIG. 7 is a flowchart of a desktop display control method provided by another embodiment of the disclosure.

As shown in FIG. 7, another example process 200 in accordance with the present disclosure may include step S210 to step S250 as described below:

Step S210: a task list is created. Wherein the task list is used for recording the task ID corresponding to the first application, and each first application corresponds to a unique task ID.

Step S220: an application switching event is detected. Wherein the application switching event includes an event that a task is moved to the foreground, an event that a task is moved to background or an event that a task is removed. Taking the ANDROID® system as an example, an event that a task is moved to the foreground(onTaskMovedToFront), an event that a task is moved to background(onTaskMovedToBack) or an event that a task is removed(onTaskRemoved) can be detected by registering a task stack listener.

And if the event that the first application is moved to the foreground is detected, step S230 is performed.

Step S230: whether the task ID corresponding to the first application already exists in the task list is determined. If there is no task ID corresponding to the first application in the task list, step S231 is performed as follow: the task ID is added to the task list; and if the event that the first application is moved to the background or the event that the first application is removed is detected, step S240 is performed.

Step S240: whether the task ID corresponding to the first application already exists in the task list is determined.

If there is the task ID corresponding to the first application in the task list, step S241 is performed as follow: the task ID is removed from the task list.

Step S250: whether the view of the first application is currently displayed on the desktop is determined according to the task list.

Wherein if the task list contains the at least one task ID corresponding to the first application, it is determined that the view of the first application is currently displayed on the desktop; and if the task list does not contain any task ID corresponding to the first application, it is determined that no view of the first application is currently displayed on the desktop. In this embodiment, the task list contains at least one task ID of the first application, which indicates that the window of at least one first application is currently displayed on the desktop. In some embodiments, a white list for storing the task IDs of the first applications is preset, and the task IDs of the foreground applications can be intersected with the white list to determine whether the first application is the foreground application. Similarly, the white list and the task list are intersected to determine whether the task list contains the task ID of the first application. In some embodiments, whether the task list contains the task ID of the first application can also be determined according to the length value of the task list; if the length value of the task list is greater than or equal to 1, it indicates that the task list contains at least one task ID; and if the length value of the task list is equal to 0, it indicates that the task list does not store any task ID corresponding to the first application. Therefore, according to one or more embodiments of the disclosure, the number of task IDs of the first application in the task list can reflect the number of windows currently displayed on the desktop, and it is more accurate than only using the foreground application.

In an embodiment, the foreground application specifically refers to the current active application which is the application currently being processed by the system and whose view gets a focus. The focus refers to the position where the event is currently being processed. In some operating systems, the foreground of the system may run multiple application processes at the same time, but there is only one focus at a time. Therefore, given that a terminal may run multiple foreground applications at the same time, it is more convenient and accurate to determine whether the view of the first application is currently displayed on the desktop according to the current active application. Taking the ANDROID® system as an example, the current active application can be acquired through the Running Tasks List, and the uppermost application in the running tasks list is the current active application, which can be acquired through list.get(0). In some embodiments, if the current active application is the first application, it is determined that the window of the first application is currently displayed on the desktop.

Figure 8:
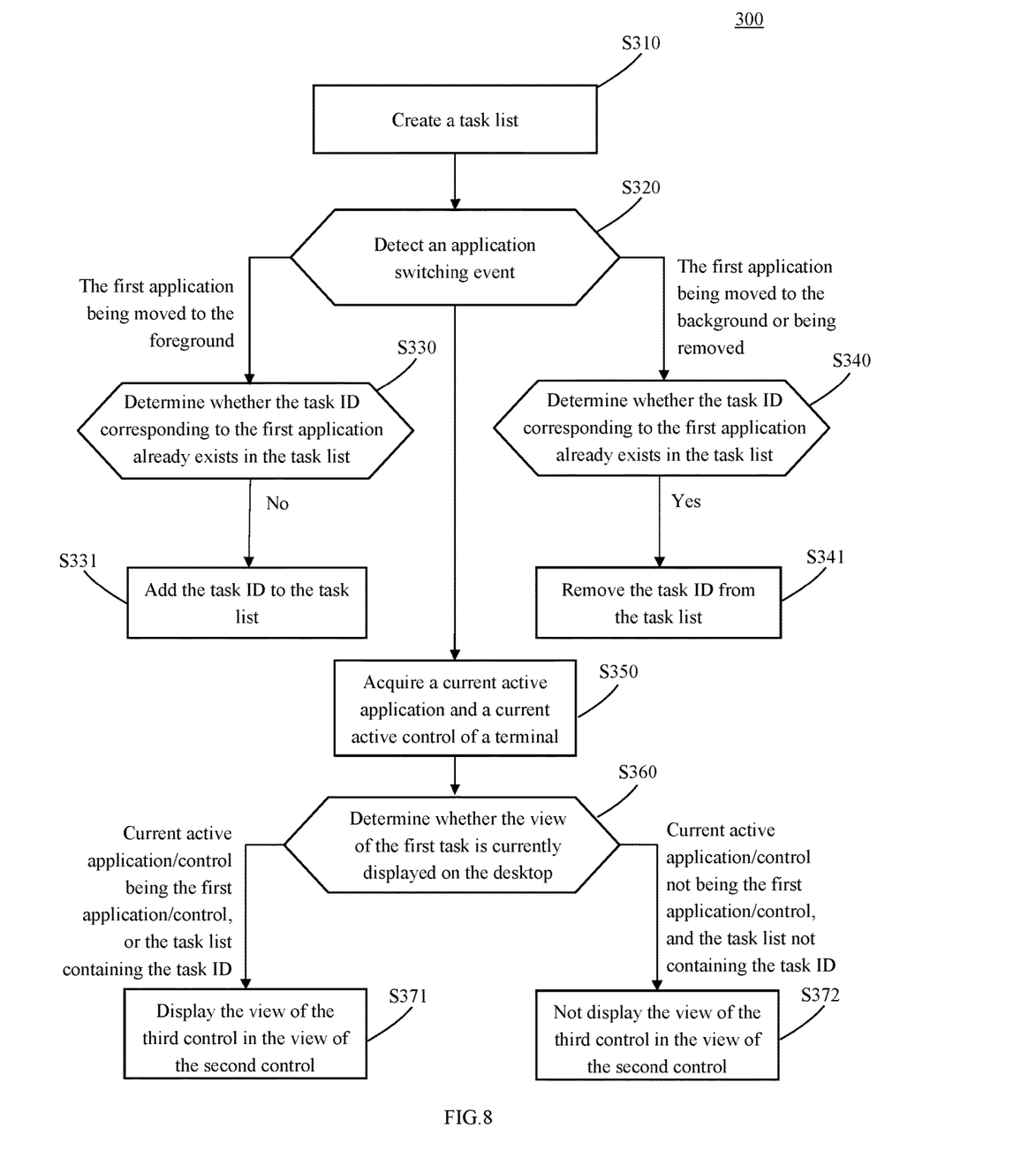
FIG. 8 is a flowchart of a desktop display control method provided by an embodiment of the disclosure.

As shown in FIG. 8, a further example process 300 in accordance with the present disclosure may comprise step S310-step S372:

Step S310: a task list is created. Wherein the task list is used for recording the task ID corresponding to the first application, and each first application corresponds to a unique task ID.

Step S320: an application switching event is detected, which includes an event that a task is moved to the foreground, an event that a task is moved to background or an event that a task is removed. Taking the ANDROID system as an example, an event that a task is moved to the foreground (onTaskMovedToFront), an event that a task is moved to background (onTaskMovedToBack) or an event that a task is removed (onTaskRemoved) can be detected by registering a task stack listener.

If an event that the first application is moved to the foreground is detected, step S330 is performed.

Step S330: whether the task ID corresponding to the first application already exists in the task list is determined. If there is no task ID corresponding to the first application in the task list, step S331 is performed as follow: the task ID is added to the task list; and if an event that the first application is moved to the background or an event that the first application is removed is detected, step S340 is performed.

Step S340: whether the task ID corresponding to the first application already exists in the task list is determined.

If there is the task ID corresponding to the first application in the task list, step S341 is performed as follow: the task ID is removed from the task list.

Step S350: the current active application and the current active control of the terminal are acquired.

Step S360: whether the view of the first application is currently displayed on the desktop is determined according to the current active application, the task list or the current active control.

If the current active application is the first application, or the task list contains at least one task ID corresponding to the first application, or the first control is the current active control, it is determined that the view of the first task is currently displayed on the desktop, and step S371 is performed as follow: the view of the third control is displayed in the view of the second control.

If the current active application is not the first application, the task list does not store any task ID corresponding to the first application, and the current active control is not the first control, then it is determined that the view of the first task is not currently displayed on the desktop, then step S372 is performed: the view of the third control is not displayed in the view of the second control.

Figure 9:
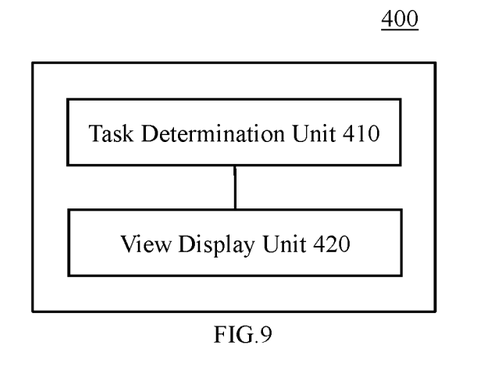
FIG. 9 is a schematic structural diagram of a desktop display control apparatus provided by an embodiment of the disclosure.

Referring to FIG. 9, an embodiment of the disclosure provides a desktop display control apparatus 400 including a task determination unit 410 and a view display unit 420.

The task determination unit 410 is used for determining whether a view of a first task is currently displayed on a desktop of a terminal.

The view display unit 420 is used for displaying a view of a third control in a view of a second control if it is determined that the view of the first task is currently displayed on the desktop; and also used for not displaying the view of the third control in the view of the second control if it is determined that the view of the first task is not currently displayed on the desktop;

And the first task comprises a first application and/or a first control, and the first application is not an application of the desktop, and the second control and the third control are both controls displayed on the desktop.

Therefore, the apparatus provided by various embodiments of the disclosure dynamically displays the view of the third control in the view of the second control according to the specific display state of the task view on the desktop, and thus a user can interact with the view of the third control conveniently, the interaction steps are simplified, and the user experience is improved.

Since the apparatus embodiment basically corresponds to the method embodiments, the relevant part can refer to the part of the description of the method embodiments. The apparatus embodiment described above is merely illustrative, and the units described as separate units may or may not be separate. Some or all of the units can be selected according to actual needs to achieve the objects of the solutions of the embodiments. Those of ordinary skill in the art can understand and implement without creative work.

In some embodiments, if the first task includes the first application, the task determination unit includes:

a foreground application acquisition unit, used for acquiring a foreground application of the terminal; and an application display determination unit, used for determining whether the view of the first application is currently displayed on the desktop according to the foreground application.

In some embodiments, the above-mentioned desktop display control apparatus further includes:

a task list creation unit, used for a task list for recording a task ID corresponding to the first application;

an application switching detecting unit, used for detecting an application-switching event, wherein the application-switching event comprises an event that a task is moved to the foreground, an event that a task is moved to background or an event that a task is removed; and a task ID unit, used for determining whether the task ID corresponding to the first application already exists in the task list if the application switching detecting unit detects an event that the first application is moved to the foreground; adding the task ID to the task list if the task ID does not exist, and used for determining whether the task ID corresponding to the first application already exists in the task list if the application switching detecting unit detects an event that the first application is moved to the background or an event that the first application is removed, and also used for removing the task ID from the task list if the task ID exists; and the application display determination unit is further used for determining whether the view of the first application is currently displayed on the desktop according to the task list.

In some embodiments, the application display determination unit is further used for determining that the view of the first application is currently displayed on the desktop if the foreground application is the first application, and/or determining that the view of the first application is not currently displayed on the desktop if the foreground application is not the first application.

In some embodiments, the application display determination unit is further used for determining that the view of the first application is currently displayed on the desktop if the task list contains at least one task ID, and/or determining that the view of the first application is not currently displayed on the desktop if the task list does not contain any task ID corresponding to the first application.

In some embodiments, it is determined that the task list contains at least one task ID if the length value of the task list is not less than 1.

In some embodiments, the foreground application is the current active application.

In some embodiments, if the first task includes the first control, the task determination unit includes:

an active control acquiring unit, used for acquiring a current active control of the terminal; and an active control determination unit, used for determining whether the view of the first control is currently displayed on the desktop according to the current active control.

In some embodiments, the active control determination unit is used for determining that the view of the first control is currently displayed on the desktop if the current active control is the first control.

In some embodiments, the active control determination unit is used for determining that the view of the first control is not currently displayed on the desktop if the current active control is not the first control.

In some embodiments, the apparatus further includes:

a first desktop display unit, used for not displaying the view of the third control on the desktop if it is determined that the view of the first task is currently displayed on the desktop.

In some embodiments, the apparatus further includes:

a second desktop display unit, used for displaying the view of the third control on the desktop if it is determined that the view of the first task is not currently displayed on the desktop.

In some embodiments, the view display unit includes:

a first calculation unit, used for calculating the size and position in the view of the second control for the view of the third control according to all of the views currently displayed in the view of the second control; and a first display unit, used for displaying the view of the third control according to the calculated size and position.

In some embodiments, the view display unit includes:

a second calculation unit, used for calculating the size and position in the view of the second control for the view of the third control according to all of the views currently displayed in the view of the second control; and a second display unit, used for not displaying the view of the third control according to the calculated size and position.

In some embodiments, the first calculation unit or the second calculation unit includes:

a view of the desktop sends a request for acquiring the size and position to the second control;

the second control calculates the size and position of the view of the third control in the view of the second control according to all the views in the view of the second control; and the view of the second control sends the size and position to the view of the desktop.

In some embodiments, the first display unit is further used for perform following operations:

the view of the desktop sends a notification of adding the view of the third control to the second control;

the view of the second control loads the view of the third control according to the calculated size and position calculated, and sets the display state of the view of the third control to be invisible;

the view of the desktop sends a notification of setting the display state of the view of the third control to be visible to the second control; and the second control sets the display state of the view of the third control to be visible.

In some embodiments, the second display unit is further used for perform following operations:

the view of the desktop sends a notification of setting the view of the third control to be invisible to the second control;

the view of the second control sets the display state of the view of the third control to be invisible according to the calculated size and position calculated;

the view of the desktop sends a notification of removing the view of the third control to the view of the second control; and the second control removes the view of the third control.

In some embodiments, the view display unit includes:

a list creation unit, used for creating a view list for recording the identifier, size and position of the third control; and a view display subunit, used for displaying the view of the third control according to the view list.

In some embodiments, the view display unit further includes:

a view removing subunit, used for removing the identifier, size and position of the third control recorded in the view list.

In some embodiments, the first desktop display unit is used for not displaying the view of the third control on the desktop after the view display unit displays the view of the third control in the view of the second control.

In some embodiments, the view display unit is used for not displaying the view of the third control in the view of the second control after the second desktop display unit displays the view of the third control on the desktop.

In some embodiments, the second control is a navigation bar; and the third control is an icon control.

In some embodiments, the layer of the view of the third control is above the layers of the view of the first task and the view of the second control.

Correspondingly, the disclosure further provides a terminal comprising: at least one processor; and at least one memory communicatively coupled to the at least one processor and storing instructions that upon execution by the at least one processor cause the terminal to perform the foregoing the desktop display control method.

Correspondingly, the disclosure further provides a non-transitory computer storage medium storing computer-readable instructions to perform the foregoing desktop display control method when the computer-readable instructions are executed by a computing device. The non-transitory computer storage media may be a ROM, a random access memory (RAM), a CD-ROM, a magnetic tape, a floppy disk, an optical data storage apparatus, etc.

Figure 10:
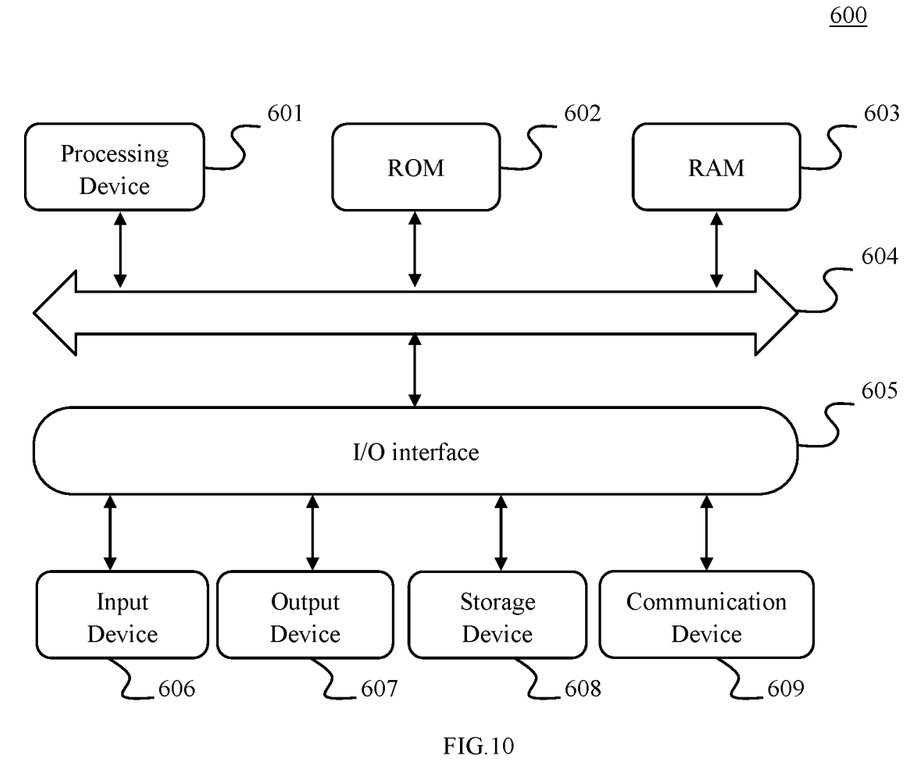
FIG. 10 is a schematic structural diagram of a terminal apparatus used for implementing an embodiment of the disclosure.

Referring now to FIG. 10, a structural schematic diagram of terminal equipment 400 suitable for implementing an embodiment of the disclosure is shown. The terminal equipment in the embodiment of the present disclosure can include, but is not limited to, mobile terminals such as a mobile phone, a notebook computer, a digital broadcast receiver, a personal digital assistant (PDA), a Pad, a portable media player (PMP) and a vehicle-mounted terminal (e.g., vehicle-mounted navigation terminal), and fixed terminals such as a digital TV and a desktop computer. The terminal equipment shown in FIG. 10 is only an example, and should not bring any restrictions on the functions and application scope of the embodiments of the present disclosure.

As shown in FIG. 10, the terminal equipment 600 can comprise a processing device (e.g., central processing unit, graphics processor, etc.) 601, which can perform various appropriate actions and processing according to a program stored in a read-only memory (ROM) 602 or a program loaded into a random access memory (RAM) 603 from a storage device 608. In the RAM 603, various programs and data required for the operation of the terminal equipment 600 are also stored. The processing device 601, the ROM 602, and the RAM 603 are connected through a bus 604. An Input/Output (I/O) interface 605 is also connected to the bus 604.

Generally, the following devices can be connected to the I/O interface 605: an input device 606 such as a touch screen, a touch pad, a keyboard, a mouse, a camera, a microphone, an accelerometer and a gyroscope; an output device 607 such as a liquid crystal display (LCD), a speaker and a vibrator; a storage device 608 such as a magnetic tape and a hard disk; and a communication device 609. The communication device 609 can allow the terminal equipment 600 to perform wireless or wired communication with other equipment to exchange data. Although FIG. 10 shows the terminal equipment 600 with various devices, it should be understood that it is not required to implement or provide all the devices shown. More or fewer devices may alternatively be implemented or provided.

Particularly, according to the embodiments of the disclosure, the processes described above with reference to the flowcharts may be implemented as computer software programs. For example, the embodiments of the disclosure comprise a computer program product comprising a computer program carried by a computer-readable medium, and the computer program contains program codes for executing the method shown in the flowcharts. In such embodiment, the computer program can be downloaded and installed from a network through the communication device 609, or installed from the storage device 608, or installed from the ROM 602. When the computer program is executed by the processing device 601, the above functions defined in the method of the embodiments of the disclosure are executed.

It should be noted that the above-mentioned computer-readable medium can be a computer-readable signal medium or a computer-readable storage medium or any combination of the two. The computer-readable storage medium may be, for example, but not limited to, an electrical, magnetic, optical, electromagnetic, infrared or semiconductor system, device or component, or any combination of the above. More specific examples of the computer-readable storage medium may include, but are not limited to, an electrical connector with one or more wires, a portable computer disk, a hard disk, an RAM, an ROM, an electrically erasable programmable read only memory (EPROM) or flash memory, an optical fiber, a portable compact disc read-only memory (CD-ROM), an optical storage device, a magnetic storage device, or any suitable combination of the above. In the disclosure, the computer-readable storage medium can be any tangible medium containing or storing a program, which can be used by or in combination with an instruction execution system, device or component. In the disclosure, the computer-readable signal medium can comprise a data signal propagated in a baseband or as part of a carrier wave, in which computer-readable program codes are carried. This propagated data signal can take various forms, including but not limited to an electromagnetic signal, an optical signal or any suitable combination of the above. The computer-readable signal medium can also be any computer-readable medium other than the computer-readable storage medium, and the computer-readable signal medium can send, propagate or transmit the program for use by or in connection with the instruction execution system, device or component. The program codes contained in the computer-readable medium can be transmitted by any suitable medium, including but not limited to electric wire, optical cable, radio frequency (RF) or any suitable combination of the above.

In some embodiments, the client and the server can use any currently known or future developed network protocols such as HTTP (HyperText Transfer Protocol) to communicate, and can communicate with any form or medium digital data communications (e.g., communications networks) interconnected. Examples of communication networks include local area networks ("LAN"), wide area networks ("WAN"), the Internet, and peer-to-peer networks (e.g., ad hoc peer-to-peer networks), as well as any currently known or future developed network.

The computer-readable medium can be included in the terminal equipment, and can also exist alone without being assembled into the terminal equipment.

The computer-readable medium carries one or more programs, and when the one or more programs are executed by the terminal equipment, the terminal equipment is caused to: determine whether a view of a first task is currently displayed on a desktop; if it is determined that the view of the first task is currently displayed on the desktop, display a view of a third control in a view of a second control; and if it is determined that the view of the first task is not currently displayed on the desktop, not display the view of the third control in the view of the second control; wherein the first task comprises a first application and/or a first control, wherein the first application is not an application of the desktop, and wherein the second control and the third control are both controls displayed on the desktop.

Or, the computer-readable medium carries one or more programs, and when the one or more programs are executed by the terminal equipment, the terminal equipment is caused to: determine whether a view of a first task is currently displayed on a desktop; if it is determined that the view of the first task is currently displayed on the desktop, display a view of a third control in a view of a second control; and if it is determined that the view of the first task is not currently displayed on the desktop, not display the view of the third control in the view of the second control; wherein the first task comprises a first application and/or a first control, wherein the first application is not an application of the desktop, and wherein the second control and the third control are both controls displayed on the desktop.

Computer program codes for performing the operations of the disclosure can be written in one or more programming languages or a combination thereof, including object-oriented programming languages such as JAVA®, SMALLTALK®, C++, and conventional procedural programming languages such as "C" language or similar programming languages. The program code can be completely or partially executed on a user computer, executed as an independent software package, partially executed on a user computer and partially executed on a remote computer, or completely executed on a remote computer or server. In a case involving a remote computer, the remote computer can be connected to a user computer through any kind of network including a local area network (LAN) or a wide area network (WAN), or can be connected to an external computer (e.g., connected through the Internet using an Internet service provider).

The flowcharts and block diagrams in the drawings show the architectures, functions and operations of possible implementations of systems, methods and computer program products according to various embodiments of the disclosure. In this regard, each block in the flowchart or block diagram can represent a module, a program segment or part of a code that contains one or more executable instructions for implementing a specified logical function. It should also be noted that in some alternative implementations, the functions noted in the blocks can also occur in a different order from those noted in the drawings. For example, two consecutive blocks can actually be executed in substantially parallel, and sometimes they can be executed in reverse order, depending on the functions involved. It should also be noted that each block in the block diagrams and/or flowcharts, and combinations of blocks in the block diagrams and/or flowcharts, can be implemented with dedicated hardware-based systems that perform specified functions or actions, or can be implemented with combinations of dedicated hardware and computer instructions.

The modules or units described in the embodiments of the disclosure can be implemented by software or hardware. The name of a module or unit does not constitute a limitation to the module or unit itself under certain circumstances. For example, the task determination unit can also be described as "a unit for determining whether a view of a first task is currently displayed on a desktop".

The functions described herein above may be performed, at least in part, by one or more hardware logic components. For example, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and etc.

In the context of the present disclosure, a machine-readable medium may be a tangible medium that may contain or store programs for use by or in combination with an instruction execution system, device, or device. The machine-readable medium may be a machine-readable signal medium or a machine-readable storage medium. Machine readable media may include, but are not limited to, electronic, magnetic, optical, electromagnetic, infrared, or semiconductor systems, devices or devices, or any suitable combination of the above. More specific examples of machine-readable storage media will include electrical connections based on one or more lines, portable computer disks, hard disks, random access memory (RAM), read only memory (ROM), erasable programmable read only memory (EPROM or flash memory), optical fibers, portable compact disk read only memory (CD-ROM), optical storage devices, magnetic storage devices or any suitable combination of the above.

In some embodiments, the disclosure provides a desktop display control method, comprising: determining whether a view of a first task is currently displayed on a desktop; if it is determined that the view of the first task is currently displayed on the desktop, displaying a view of a third control in a view of a second control; and if it is determined that the view of the first task is not currently displayed on the desktop, not displaying the view of the third control in the view of the second control; wherein the first task comprises a first application and/or a first control, wherein the first application is not an application of the desktop, and wherein the second control and the third control are both controls displayed on the desktop.

In some embodiments, if the first task comprises the first application, the determining whether a view of a first task is currently displayed on a desktop comprises: acquiring a foreground application of a terminal; and determining whether a view of the first application is currently displayed on the desktop according to the foreground application.

In some embodiments, wherein the acquiring a foreground application of a terminal comprises: creating a task list for recording a task ID corresponding to the first application; detecting an application-switching event, wherein the application-switching event comprises an event that a task is moved to the foreground, an event that a task is moved to background or an event that a task is removed; determining whether the task ID corresponding to the first application already exists in the task list if an event that the first application is moved to the foreground is detected; if the task ID does not exist, adding the task ID to the task list;

determining whether the task ID corresponding to the first application already exists in the task list if the event that the first application is moved to the background or the event that the first application is removed is detected; if the task ID exists, removing the task ID from the task list; wherein the determining whether a view of the first application is currently displayed on the desktop according to the foreground application comprises: determining whether the view of the first application is currently displayed on the desktop according to the task list.

In some embodiments, wherein the determining whether a view of the first application is currently displayed on the desktop according to the foreground application comprises: determining that the view of the first application is currently displayed on the desktop if the foreground application is the first application; and/or determining that the desktop does not currently display the view of the first application if the foreground application is not the first application.

In some embodiments, wherein the determining whether the view of the first application is currently displayed on the desktop according to the task list comprises: determining that the view of the first application is currently displayed on the desktop if the task list contains at least one task ID; and/or determining that the view of the first application is not currently displayed on the desktop if the task list does not contain any task ID corresponding to the first application.

In some embodiments, wherein it is determined that the task list contains at least one task ID if the length value of the task list is not less than 1.

In some embodiments, wherein the foreground application is a current active application.

In some embodiments, wherein if the first task comprises a first control, the determining whether a view of a first task is currently displayed on a desktop comprises: acquiring a current active control of a terminal; and determining whether the desktop currently displays the view of the first control according to the current active control.

In some embodiments, wherein the determining whether the desktop currently displays the view of the first control according to the current active control comprises: determining that the desktop currently displays the view of the first control if the current active control is the first control.

In some embodiments, wherein the determining whether the desktop currently displays the view of the first control according to the current active control comprises: determining that the desktop does not currently display the view of the first control if the current active control is not the first control.

In some embodiments, the desktop display control method further comprises: if it is determined that the view of the first task is currently displayed on the desktop, not displaying the view of the third control on the desktop.

In some embodiments, the desktop display control method further comprises: if it is determined that the view of the first task is not currently displayed on the desktop, displaying the view of the third control on the desktop.

In some embodiments, wherein the displaying a view of a third control in a view of a second control comprises: calculating the size and position in the view of the second control for the view of the third control according to all of the views currently displayed in the view of the second control; and displaying the view of the third control according to the calculated size and position.

In some embodiments, wherein the not displaying the view of the third control in the view of the second control comprises: calculating the size and position in the view of the second control for the view of the third control according to all of the views currently displayed in the view of the second control; and not displaying the view of the third control according to the calculated size and position.

In some embodiments, wherein the calculating the size and position in the view of the second control for the view of the third control according to all of the views currently displayed in the view of the second control comprises: sending a request for acquiring the size and position to the second control by a view of the desktop; calculating the size and position in the view of the second control for the view of the third control according to all of the views currently displayed in the view of the second control; and sending the calculated size and position to the view of the desktop by the view of the second control.

In some embodiments, wherein the displaying the view of the third control according to the calculated size and position comprises: sending a notification of adding the view of the third control to the second control by a view of the desktop; loading the view of the third control according to the calculated size and position and setting the display state of the view of the third control to be invisible by the view of the second control; sending a notification of setting the display state of the view of the third control to be visible to the second control by the view of the desktop; and setting the display state of the view of the third control to be visible by the second control.

In some embodiments, the desktop display control method according to claim 14, wherein the not displaying the view of the third control according to the calculated size and position comprises: sending a notification of setting the view of the third control to be invisible to the second control by a view of the desktop; setting the display state of the view of the third control to be invisible by the view of the second control according to the calculated size and position; sending a notification of removing the view of the third control to the second control by the view of the desktop; and removing the view of the third control by the second control.

In some embodiments, wherein the displaying the view of the third control according to the calculated size and position comprises: creating a view list for recording the identifier, size and position of the third control; and displaying the view of the third control according to the view list, and wherein the not displaying the view of the third control in the view of the second control comprises: removing the identifier, size and position of the third control recorded in the view list.

In some embodiments, wherein the not displaying the view of the third control on the desktop comprises: after displaying the view of the third control in the view of the second control, not displaying the view of the third control on the desktop.

In some embodiments, wherein the not displaying the view of the third control in the view of the second control comprises: after displaying the view of the third control on the desktop, not displaying the view of the third control in the view of the second control.

In some embodiments, wherein the second control is a navigation bar, and wherein the third control is an icon.

In some embodiments, wherein the layer of the view of the third control is above both of the layer of the view of the first task and the layer of the view of the second control.

In some embodiments, the disclosure further provides a desktop display control apparatus, comprising: a task determination unit, used for determining whether a desktop currently displays a view of a first task; and a view display unit, used for displaying a view of a third control in a view of a second control if it is determined that the view of the first task is currently displayed on the desktop; and further used for not displaying the view of the third control in the view of the second control if it is determined that the view of the first task is not currently displayed on the desktop; wherein the first task comprises a first application and/or a first control, wherein the first application is not an application of the desktop, and wherein the second control and the third control are both controls displayed on the desktop.

In some embodiments, the disclosure further provides a terminal comprising: at least one processor; and at least one memory communicatively coupled to the at least one processor and storing instructions that upon execution by the at least one processor cause the terminal to perform the foregoing the desktop display control method.

In some embodiments, the disclosure further provides a non-transitory computer storage medium storing computer-readable instructions to perform the foregoing desktop display control method when the computer-readable instructions are executed by a computing device.

The above description is only a preferred embodiment of the disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the above disclosed concept. For example, the above-mentioned features and the technical features disclosed in (but not limited to) the disclosure having similar functions are replaced with each other to form a technical solution.

In addition, although the operations are depicted in a specific order, it should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the disclosure. Certain features that are described in the context of separate embodiments may also be implemented in combination in a single embodiment. Conversely, various features that are described in the context of a single embodiment may also be implemented in multiple implementations individually or in any suitable sub-combination.

Although the subject matter has been described in a language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A desktop display control method, comprising:
   determining whether a view of a first task is currently displayed on a desktop;
   in response to determining that the view of the first task is currently displayed on the desktop, displaying a view of a third control in a view of a second control and discontinuing visible display of the view of the third control on the desktop, wherein the second control is a task bar, a navigation bar, or a status bar of the desktop, and wherein the displaying a view of a third control in a view of a second control further comprises:
      determining a size and a position of the view of the third control to be displayed in the view of the second control based on existing views displayed in the view of the second control, and
      displaying the view of the third control in the view of the second control based on the determined size and the determined position; and
   in response to determining that the desktop no longer displays the view of the first task, resuming the visible display of the view of the third control on the desk and stopping displaying the view of the third control in the view of the second control;

wherein the first task comprises a first application or a first control, wherein the first application is not an application of the desktop.

2. The desktop display control method according to claim 1, wherein if the first task comprises the first application, the determining whether a view of a first task is currently displayed on a desktop comprises:

acquiring a foreground application of a terminal; and determining whether a view of the first application is currently displayed on the desktop according to the foreground application.

3. The desktop display control method according to claim 2, wherein the acquiring a foreground application of a terminal comprises:

creating a task list for recording a task ID corresponding to the first application;

detecting an application-switching event, wherein the application-switching event comprises an event that a task is moved to the foreground, an event that a task is moved to background or an event that a task is removed;

determining whether the task ID corresponding to the first application exists in the task list if an event that the first application is moved to the foreground is detected;

if the task ID does not exist in the task list, adding the task ID to the task list;

determining whether the task ID corresponding to the first application exists in the task list if an event that the first application is moved to the background or an event that the first application is removed is detected;

if the task ID exists in the task list, removing the task ID from the task list;

wherein the determining whether a view of the first application is currently displayed on the desktop according to the foreground application comprises:

determining whether the view of the first application is currently displayed on the desktop according to the task list.

4. The desktop display control method according to claim 3, wherein the determining whether the view of the first application is currently displayed on the desktop according to the task list comprises:

determining that the view of the first application is currently displayed on the desktop if the task list contains at least one task ID; and determining that the view of the first application is not currently displayed on the desktop if the task list does not contain any task ID corresponding to the first application.

5. The desktop display control method according to claim 4, wherein it is determined that the task list contains at least one task ID if a length value of the task list is not less than 1.

6. The desktop display control method according to claim 2, wherein the determining whether a view of the first application is currently displayed on the desktop according to the foreground application comprises:

determining that the view of the first application is currently displayed on the desktop if the foreground application is the first application; and determining that the view of the first application is not currently displayed on the desktop if the foreground application is not the first application.

7. The desktop display control method according to claim 2, wherein the foreground application is a current active application.

8. The desktop display control method according to claim 1, wherein if the first task comprises a first control, the determining whether a view of a first task is currently displayed on a desktop comprises:

acquiring a current active control of a terminal; and determining whether the view of the first control is currently displayed on the desktop according to the current active control.

9. The desktop display control method according to claim 8, wherein the determining whether the view of the first control is currently displayed on the desktop according to the current active control comprises:

determining that the view of the first control is currently displayed on the desktop if the current active control is the first control; and determining that the view of the first control is not currently displayed on the desktop if the current active control is not the first control.

10. The desktop display control method according to claim 1, further comprising:

in response to determining that the view of the first task is currently displayed on the desktop, not displaying the view of the third control on the desktop; and in response to determining that the view of the first task is not currently displayed on the desktop, displaying the view of the third control on the desktop.

11. The desktop display control method according to claim 1, wherein the not displaying the view of the third control in the view of the second control comprises not displaying the view of the third control in the view of the second control based on the determined size and the determined position.

12. The desktop display control method according to claim 11, wherein the determining a size and a position of the view of the third control to be displayed in the view of the second control based on existing views displayed in the view of the second control further comprises:

sending a request for acquiring the size and the position to the second control by a view of the desktop; and sending the determined size and the determined position to the view of the desktop by the view of the second control.

13. The desktop display control method according to claim 11, wherein the displaying the view of the third control based on the determined size and the determined position comprises: sending a notification of adding the view of the third control to the second control by a view of the desktop, loading the view of the third control based on the determined size and the determined position, and setting the display state of the view of the third control to be invisible on the desktop, sending a notification of setting the display state of the view of the third control to be visible to the second control by the view of the desktop, and setting the display state of the view of the third control to be visible by the second control; or wherein the not displaying the view of the third control in the view of the second control based on the determined size and the determined position comprises: sending a notification of setting the view of the third control to be invisible to the second control by a view of the desktop, setting the display state of the view of the third control to be invisible by the view of the second control according to the determined size and the determined position, sending a notification of removing the view of the third control to the second control by the view of the desktop; and removing the view of the third control by the second control.

14. The desktop display control method according to claim 1, further comprising:
creating a view list for recording an identifier, the size and the position of the third control;
wherein the displaying the view of the third control based on the determined size and the determined position comprises displaying the view of the third control according to the view list; and
wherein the not displaying the view of the third control in the view of the second control comprises removing the identifier, the size and the position of the third control recorded in the view list.

15. The desktop display control method according to claim 1, further comprising:
after the displaying the view of the third control in the view of the second control, discontinuing the visible display of the third control on the desktop.

16. The desktop display control method according to claim 1, further comprising:
after resuming the visible display of the view of the third control on the desktop, stopping displaying the view of the third control in the view of the second control.

17. The desktop display control method according to claim 1, wherein the first task, the second control, and the third control are each presented within independent layers, and the layer of the view of the third control is above both of the layer of the view of the first task and the layer of the view of the second control.

18. A desktop display control apparatus, comprising:
at least one processor; and
at least one memory communicatively coupled to the at least one processor and storing instructions that upon execution by the at least one processor cause the apparatus to perform operations comprising:
determining whether a desktop currently displays a view of a first task; and
in response to determining that the view of the first task is currently displayed on the desktop, displaying a view of a third control in a view of a second control and discontinuing visible display of the view of the third control on the desktop, wherein the second control is a task bar, a navigation bar, or a status bar of the desktop, and wherein the displaying a view of a third control in a view of a second control further comprises:
determining a size and a position of the view of the third control to be displayed in the view of the second control based on existing views displayed in the view of the second control, and
displaying the view of the third control in the view of the second control based on the determined size and the determined position; and
in response to determining that the desktop no longer displays the view of the first task, resuming the visible display of the view of the third control on the desk and stopping displaying the view of the third control in the view of the second control;
wherein the first task comprises a first application or a first control, wherein the first application is not an application of the desktop.

19. A non-transitory computer storage medium, storing computer-readable instructions to perform operations when the computer-readable instructions are executed by a computing device, the operations comprising:
determining whether a view of a first task is currently displayed on a desktop;
in response to determining that the view of the first task is currently displayed on the desktop, displaying a view of a third control in a view of a second control and discontinuing visible display of the view of the third control on the desktop, wherein the second control is a task bar, a navigation bar, or a status bar of the desktop, and wherein the displaying a view of a third control in a view of a second control further comprises:
determining a size and a position of the view of the third control to be displayed in the view of the second control based on existing views displayed in the view of the second control, and
displaying the view of the third control in the view of the second control based on the determined size and the determined position; and
in response to determining that the desktop no longer displays the view of the first task, resuming the visible display of the view of the third control on the desk and stopping displaying the view of the third control in the view of the second control;
wherein the first task comprises a first application or a first control, wherein the first application is not an application of the desktop.

\* \* \* \* \*